Patented Dec. 11, 1934

1,983,703

UNITED STATES PATENT OFFICE 1,983,703

TREATMENT OF RUBBER LATEX

John McGavack, Leonia, N. J., assignor to The Naugatuck Chemical Company, Naugatuck, Conn., a corporation of Connecticut No Drawing. Application February 23, 1933, Serial No. 658,137

5 Claims. (Cl. 18—50)

This invention relates to the creaming of rubber latex, and more particularly to creaming of fresh latex in plantation countries.

It has been known for a considerable time that if certain organic colloidal materials such as Karaya gum, glue, ammonium alginate, Irish moss, pectin bodies, and the like, are added to latex in proper amounts, separation of the rubber phase will eventually occur. In this way it has been possible to concentrate and purify latex. In using these so-called creaming agents with fresh latex, by which is meant latex that has been removed from the tree for only a short time, say up to ten days, considerable time intervals are necessary in order to obtain the desired amount of separation of the rubber-rich portion and the serum portion for the proper concentration or purification of the rubber in the rubber-rich portion. In the present methods of creaming of fresh latex, a small amount of ammonia is added to the latex to protect the same against putrefaction, and then the usual amount of creaming agent is added, and the separation of the rubber-rich and serum portions allowed to take place. After creaming, sufficient additional ammonia is added to the cream to preserve it for shipping. In using the usual amount of creaming agents on a fresh latex that has been standing after tapping for a period of time up to ten days, the separation of the rubber-rich and serum portions takes considerably longer than in the case of latex that has been tapped a long time. It sometimes takes two weeks or longer standing to obtain a creaming to 60% concentration with fresh latex, while with latex that has been standing, separation occurs much more rapidly. In any case, following the addition of the creaming agent, there is always an induction period of 3 to 24 hours during which substantially no creaming takes place, resulting in loss of time and in the tying up of considerable equipment. The duration of the induction period generally varies with the age of the latex.

The present invention relates particularly to increasing the rate of creaming, or separation of the rubber-rich and serum portions, after addition of creaming agents to fresh latex, and to eliminating the induction period usually following such addition.

In carrying out the present invention, latex as it comes from the tree is preserved by the addition of a small amount of an ordinary preservative, such as ammonia or fixed alkali, in the usual manner. To the thus preserved latex are added a small amount of water-soluble soap and the usual creaming agent. The induction period is reduced practically to zero, and the rate of separation of the rubber-rich layer and serum layer is greatly increased, by the addition of the small amount of soluble soap. Various soaps may be used, such as the common fatty acid soaps of ammonia, sodium, or potassium. It is preferable to use ammonium or potassium soaps, as these, in the amounts used, do not cause gel formation during the creaming. With ammonia-preserved latex it is perhaps preferable to use an ammonium soap.

The addition of soap in the creaming of fresh latex provides a method of greatly increasing the speed of the separation of the rubber-rich and serum portions, and provides the first method discovered for eliminating the usual induction period by chemical means. The separation may in addition be further hastened by the usual methods of increasing the separation during creaming, such as by heating, for example by passing steam into the latex.

In order to illustrate the present invention, but without intention to limit the invention except as required by the prior art, the following examples are included:

Example No. 1

Freshly tapped latex, having a concentration of 32% rubber solids was preserved by the addition of a small amount, about .2 to .5% ammonia, and was then treated with varying amounts of the potassium soaps of cocoanut oil acids, 0.2 of ammonium alginate per 100 parts of rubber solids being added in each case as the creaming agent. The creaming rates at atmospheric temperature for the latex without soap and the latices containing varying amounts of soap are shown in the following table.

| Concentration of soap | Percentage of serum after various time intervals of creaming | | |
|---|---|---|---|
| | After 24 hrs. | After 48 hrs. | After 72 hrs. |
| 0 | 2 | 6 | 8.4 |
| 0.1 | 3.4 | 10.4 | 24 |
| 0.2 | 36.4 | 36.6 | 39.8 |
| 0.3 | 34 | 40 | 43 |
| 0.4 | 31 | 37 | 40 |

It may be seen here that the rate of creaming with even small amounts of soap is greatly increased over the rate where no soap is present, and that an economical and satisfactory degree of creaming is obtained, particularly with 0.2 to 0.3% of soap, in periods of time during which no useful degree of separation occurs in the absence of added soap.

*Example No. 2*

Another latex having a 32% rubber solids was preserved as it came from the tree in the usual manner with ammonia and then treated with varying amounts of the potassium soap of sulphonated undecylenic acid. As in the previous example, 0.2 part of ammonium alginate per 100 parts of rubber solids was used in each case as the creaming agent. The percentage of serum obtained after 24 hours with the latex to which no soap had been added and with the latices to which varying small amounts of soap had been added, after 24 hours standing at atmospheric temperature, are given in the table below.

| Percent potassium soap of sulphonated undecylenic acid | Percent serum after 24 hrs. |
|---|---|
| 0 | 2.0 |
| 0.105 | 10.4 |
| 0.210 | 43.0 |
| 0.315 | 42.0 |
| 0.420 | 45.0 |

Again it may be seen that the rate of creaming with small amounts of soap is greatly increased over the creaming rate where no soap has been added, and that the usual long induction period has been eliminated.

*Example No. 3*

In a manner similar to that of Examples 1 and 2, a fresh latex containing 32% rubber solids was preserved with ammonia, and was then treated with varying amounts of ammonium laurate and 0.2 part of ammonium alginate per 100 parts of rubber solids. The percentages of serum after standing for 24 hours at atmospheric temperature for the latex without soap addition and for the latices with various added amounts of ammonium laurate are given in the table below.

| Percent ammonium laurate | Percent serum after 24 hours |
|---|---|
| 0 | 8 |
| 0.1 | 47 |
| 0.2 | 49 |
| 0.3 | 49 |

Again the marked increase in the rate of creaming and the elimination of the induction period by virtue of the small amounts of soap is illustrated.

Various other soaps, such as potassium or ammonium stearate, sodium, ammonium or potassium oleate, in fact, broadly speaking, any ammonium sodium, or potassium soap of a fatty acid either saturated or unsaturated and having a chain of from 5 to 24 carbon atoms, or of sulfonated derivatives of such fatty acids, is satisfactory. Other creaming agents, of course, may be readily utilized with similar results. For example 0.7 part of powdered pectin, 0.6 part of powdered Karaya gum, or 0.4 part of soluble Irish moss extract (per 100 parts rubber solids) may be utilized successfully in place of the 0.2 part of ammonium alginate shown in the examples above. Of course, other amounts of the various creaming agents disclosed may be used, those given being merely the optimum amounts as used in creaming practices at the present times. As above stated, well known methods of increasing the speed of separation of the rubber-rich and serum layers following the addition of creaming agents, such as heating indirectly or passing steam into the latex, may be utilized to still further hasten the separation.

Various other modifications will occur to those skilled in the art and it is not intended to limit the invention other than as set forth in the appended claims.

Having thus described my invention, what I claim and desire to protect by Letters Patent is:

1. A process for creaming fresh latex comprising incorporating small amounts of a water-soluble soap and a creaming agent in said latex.

2. A process for treating fresh latex comprising segregating a rubber containing portion therefrom by allowing the latex to cream after treatment with small amounts of a water-soluble soap and a creaming agent, removing the aqueous portion therefrom, and recovering an uncoagulated concentrated dispersion from said latex.

3. A process for concentrating fresh latex comprising segregating a rubber containing portion therefrom by treating the fresh latex with small amounts of water-soluble soap and creaming agent, removing the aqueous portion therefrom, and recovering an uncoagulated concentrated rubber dispersion from said latex.

4. A process for creaming fresh latex comprising adding small amounts of soluble soap and creaming agent to said latex, and allowing the latex to separate into a rubber-rich portion and a serum portion.

5. A process for creaming fresh latex comprising adding to said latex small amounts of ammonia, and ammonium soap, and a creaming agent.

JOHN McGAVACK.